Patented Nov. 22, 1938

2,137,810

UNITED STATES PATENT OFFICE 2,137,810

DIRECT DYES, PROCESS, AND PRODUCT

Swanie S. Rossander, Wilmington, Del., assignor to E. I. du Pont de Nemours & Company, Wilmington, Del., a corporation of Delaware No Drawing. Application June 11, 1937, Serial No. 147,699

7 Claims. (Cl. 8—46)

A. This invention relates to azo dyestuffs, in particular to azo dyestuffs of the type which are applied by impregnation of the fiber with a compound having free amino groups, azotization on the fiber, and coupling with suitable coupling components.

B. There has recently been a demand in the industry for very fast to washing azo dyestuffs. It is well-known that colors of the lighter shades are very frequently lacking in this respect and this is particularly true of reds and scarlets. It is an object of this invention to meet the demands of the trade by producing red and scarlet azo dyes of outstanding properties.

C. The objects of this invention have been accomplished by applying to cellulose, by which term are included the normal substances which go by the name of cellulose together with the regenerated celluloses, the direct colors which are described in my copending application, Serial No. 147,698, azotizing the free amino groups of those colors on the fiber and coupling the colors to suitable end components. In the preferred form of the invention the direct dye has the formula:

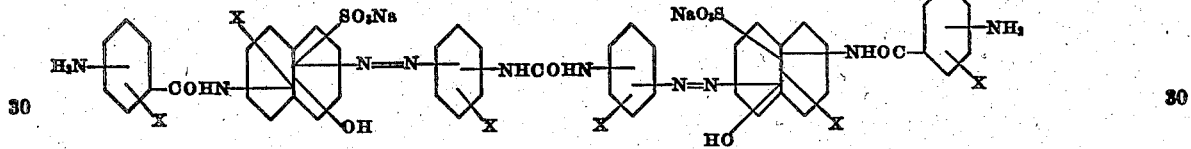

in which X is one of a group consisting of hydrogen, halogen, alkyl, alkoxy, alphyl, carboxy, and sulfonic acid, and the end component is beta naphthol, and in which the amino group is one of the position consisting of meta or para to the COHN group, amino-naphthol-sulfonic acid is 2-amino-5-naphthol-7-sulfonic acid, and in which the diamino-diphenyl-urea is one of the group consisting of 3:3' and 4:4'-diamino-diphenyl-urea.

D. The direct dyes are prepared by azotizing and coupling di-(amino-aryl)-urea with N-(amino-aroyl)-amino-naphthol sulfonic acids or [N-(amino-aroyl) - N - (amino - aroyl)] - amino-naphthol sulfonic acids. The aryl of the diazo component is preferably a single benzene nucleus, but it may also be a single naphthalene nucleus. Aryl may bear other substituent groups, such as halogen, alkyl, alkoxy, alphyl, carboxy, and sulfonic acid. The coupling components to which the said azotized ureas are coupled may desirably be N - (amino - aroyl) - amino-naphthol-sulfonic acids in which the (amino-aroyl) group may be repeated and the amino-aroyl itself may desirably include para-amino-benzoyl-J-acid, meta-amino-benzoyl-J-acid, para-amino-benzol-para-amino-benzoyl-J-acid, or meta-amino-benzoyl-meta-amino-benzoyl-J-acid. The amino - naphthol sulfonic acid is preferably 2-amino-5-naphthol-7-sulfonic acid, but the isomers thereof and polysulfonic acids (such as 1-amino-8-naphthol-3:6-disulfonic acid) may likewise be used.

E. The substituents halogen, alkyl, alkoxy, etc., may be substituted in any position of the nuclei of these dyes except that the coupling positions in the naphthalene and other nuclei must not be blocked.

F. In the preferred embodiment the urea derivative is 3:3'-diamino-diphenyl-urea, but the other ureas such as 4:4'-diamino-diphenyl-urea also produce excellent colors. The dyes will usually be applied in the form of their sodium salt.

G. The following examples illustrate the invention but are not limitative thereof:

Example I

Five parts of cotton piece goods are dyed in the usual manner, known to those in the art, with two hundredths parts of 3:3' - diamino - diphenyl urea⇄(MAB J-acid)₂. The dyed fabric is rinsed in cold water and put in 200 parts of water at 20° C. Add three tenths parts of sodium nitrite and four tenths parts of sulfuric acid. Stir 15 minutes. Rinse with cold water. Dissolve one tenth part of beta naphthol in 200 parts water and one twentieth part of caustic soda. Stir the solution rapidly while adding the above rinsed piece goods. Stir for 15 minutes. Rinse in cold water and dry. The dyeing is a scarlet shade. The probable formula of the dye on the fiber is:

J. An advantage of the invention is the production of scarlet and red shade dyes which are extremely fast to washing.

| Ex. | Diazo component | Coupling component | Shade on cotton or regenerated cellulose |
|---|---|---|---|
| 2 | 3:3'-diamino-diphenyl urea ⇄ (PAB J-acid)₂ | Beta naphthol | Scarlet. |
|   |   | 1-phenyl-3-methyl-5-pyrazolone. | Yellow scarlet. |
|   |   | Aceto-acetanilide | Do. |
|   |   | Meta-tolylene diamine | Scarlet. |
| 3 | 3:3'-diamino-diphenyl urea ⇄ (MAB J-acid)₂ | Beta naphthol | Do. |
| 4 | 3:3'-diamino-diphenyl urea → one mole PAB J-acid → one mole MAB J-acid | ----do---- | Do. |
| 5 | 4:4'-diamino-diphenyl urea ⇄ (PAB J-acid)₂ | ----do---- | Red. |
| 6 | 4:4'-diamino-diphenyl urea ⇄ (MAB J-acid)₂ | ----do---- | Do. |
| 7 | 4:4'-diamino-diphenyl urea → one mole PAB J-acid → one mole MAB J-acid | ----do---- | Do. |
| 8 | 3:3'-diamino-diphenyl-urea ⇄ (PAB-PAB J-acid)₂ | ----do---- | Scarlet. |
| 9 | 3:3'-diamino-diphenyl-urea ⇄ (MAB-MAB J-acid)₂ | ----do---- | Do. |

H. The preferred end compound is beta-naphthol, but 1-phenyl-3-methyl-5-pyrazolone, aceto-acetanilide, and metatolylene-diamine may also be used in the production of excellent colors. In a broader sense the end component is a coupling component consisting of an hydroxy or an amino compound from the benzene, naphthalene, pyrazolone, and aceto-acetarylide classes, which in each instance is free from water-solubilizing groups, such as carboxylic and sulfonic acids.

I. The end component may bear the same substituents (except in the coupling position) that may be included in the other nuclei. The symbol M. A. B. means meta-amino-benzoyl, and the symbol P. A. B. means para-amino-benzoyl.

K. As many apparently widely different embodiments of this invention may be made without departing from the spirit and scope thereof, it is to be understood that I do not limit myself to the specific embodiments thereof except as defined in the appended claims.

I claim:

1. A dyestuff represented by the formula:

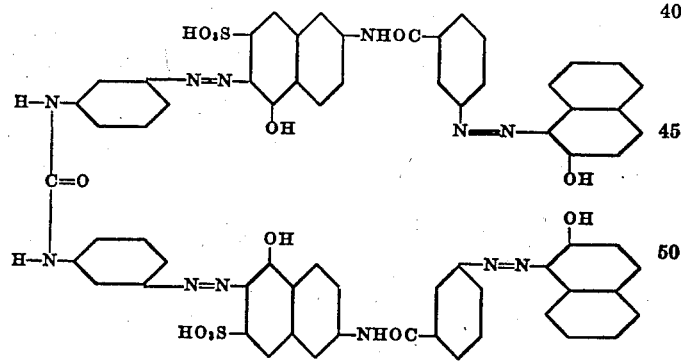

2. A dyestuff represented by the formula:

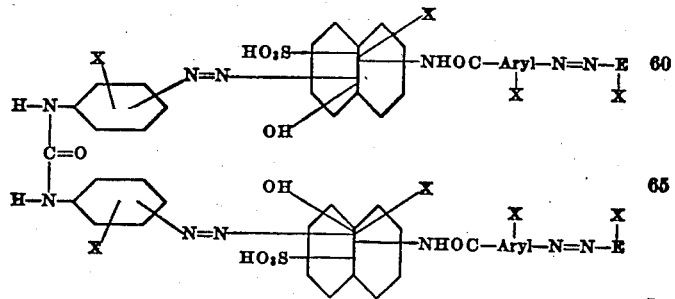

in which X is one of a group consisting of hydrogen, halogen, alkyl, alkoxy, alphyl, carboxy, sulfonic acid, aryl is an aromatic radical from the group consisting of benzene and naphthalene, E is an end component being a radical having a nucleus consisting of one of the group benzene, naphathalene, pyrazolone, aceto-acetanilide free fgrom sulfonic or carboxylic acid groups.

3. A compound having the formula of claim 2 in which the end azo groups are meta or para to the CONH groups, in which the amino-naphthol-sulfonic acid is 2-amino-5-naphthol-7-sulfonic acid, and in which the diamino-diphenyl-urea is one of the group consisting of 3:3' and 4:4'-diamino-diphenyl-urea.

4. The process which comprises impregnating cellulose with 3:3'-diamino-diphenyl-urea which had been azotized and coupled to two mols of 2(3'-amino-benzoyl-amino) 5-naphthol-7-sulfonic acid, rinsing the dyed fabric, azotizing the color thereon, and coupling with beta-naphthol.

5. The process which comprises azotizing a compound represented by the formula:

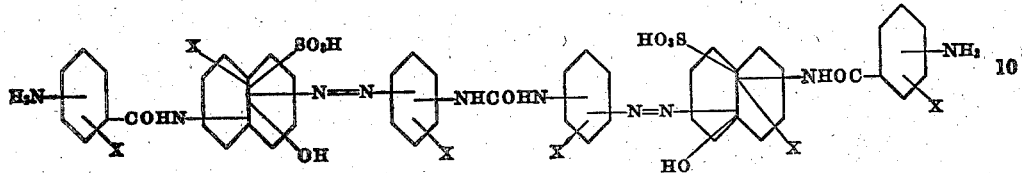

in which X is one of a group consisting of hydrogen, halogen, alkyl, alkoxy, alphyl, carboxy, and sulfonic acid, and coupling it to one of the group of coupling components consisting of beta-naphthol, 1-phenyl-3-methyl-5-pyrazolone, aceto-acetanilide, and meta-tolylene-diamine.

6. 3:3'-diamino-diphenyl-urea
→2(4'-amino-benzoyl-amino) 5-naphthol-7-sulfonic acid→beta naphthol
→2(4'-amino-benzoyl-amino) 5-naphthol-7-sulfonic acid→beta naphthol in which → means coupled by the diazo reaction.

7. 3:3'-diamino-diphenyl-urea
→2(4'-amino-benzoyl-amino) 5-naphthol-7-sulfonic acid→1-phenyl-3-methyl-5-pyrazolone
→2(4'-amino-benzoyl-amino) 5-naphthol-7-sulfonic acid→1-phenyl-3-methyl-5-pyrazolone.

SWANIE S. ROSSANDER.